United States Patent
McGowen

(10) Patent No.: US 9,248,775 B2
(45) Date of Patent: Feb. 2, 2016

(54) PORTABLE FLUID STORAGE SYSTEM

(76) Inventor: Victor L. McGowen, Oklahoma City, OK (US)

(*) Notice: Subject to any disclaimer, the term of this patent is extended or adjusted under 35 U.S.C. 154(b) by 0 days.

(21) Appl. No.: 13/440,256

(22) Filed: Apr. 5, 2012

(65) Prior Publication Data

US 2012/0255957 A1    Oct. 11, 2012

Related U.S. Application Data

(60) Provisional application No. 61/471,973, filed on Apr. 5, 2011, provisional application No. 61/559,235, filed on Nov. 14, 2011.

(51) Int. Cl.
*B65D 88/00* (2006.01)
*B65D 88/12* (2006.01)
*B60P 3/22* (2006.01)

(52) U.S. Cl.
CPC ............... *B60P 3/221* (2013.01); *B65D 88/005* (2013.01); *B65D 88/12* (2013.01); *B65D 88/121* (2013.01)

(58) Field of Classification Search
CPC ..... B65D 88/005; B65D 88/12; B65D 88/121
USPC ............ 220/8, 666, 564, 681, 1.5, 4.21, 4.28
See application file for complete search history.

(56) References Cited

U.S. PATENT DOCUMENTS

| | | | |
|---|---|---|---|
| 4,488,752 A | | 12/1984 | Broussard |
| 4,711,257 A | * | 12/1987 | Kobayashi ................... 134/56 R |
| 5,044,866 A | * | 9/1991 | Harp .............................. 414/495 |
| 5,170,901 A | * | 12/1992 | Bersani ........................... 220/1.5 |
| 6,026,685 A | * | 2/2000 | Weterrings et al. ............. 73/429 |
| 6,112,929 A | * | 9/2000 | Ota .................................... 220/8 |
| 6,302,475 B1 | | 10/2001 | Anderson |
| 6,896,307 B2 | * | 5/2005 | Nye et al. ................... 296/26.01 |
| 7,404,580 B2 | * | 7/2008 | Michael ......................... 280/837 |
| 2008/0179324 A1 | * | 7/2008 | McGough et al. ................ 220/8 |
| 2010/0025407 A1 | | 2/2010 | Benson |
| 2010/0074723 A1 | | 3/2010 | Lancon |
| 2010/0147860 A1 | | 6/2010 | McKenzie |

FOREIGN PATENT DOCUMENTS

JP         07-033192         2/1995

OTHER PUBLICATIONS

ISA/KR, International Search Report and Written Opinion of the International Search Authority, Oct. 12, 2012.

* cited by examiner

*Primary Examiner* — Jeffrey Allen
*Assistant Examiner* — Jennifer Castriotta
(74) *Attorney, Agent, or Firm* — Sean O'Connell, PLLC

(57) ABSTRACT

A portable fluid storage system for use during frac jobs or other operations requiring storage of water or other fluids. The system comprises a lower chamber and an upper chamber sized to fit within the lower chamber. A lift system, such as screw jacks or rack and pinion gears, is disposed to move the lower chamber from a collapsed position to an extended position where the upper chamber is positioned above the lower chamber. A seal is disposed to engage the upper chamber and the lower chamber when the system is in the extended position. The upper chamber, the seal, and the lower chamber form a water tight compartment when the system is in the extended position. The system is transported as a traditional frac tank with a tractor or other truck. When positioned for use, the storage system is expanded to hold twice as much fluid as a traditional tank.

12 Claims, 15 Drawing Sheets

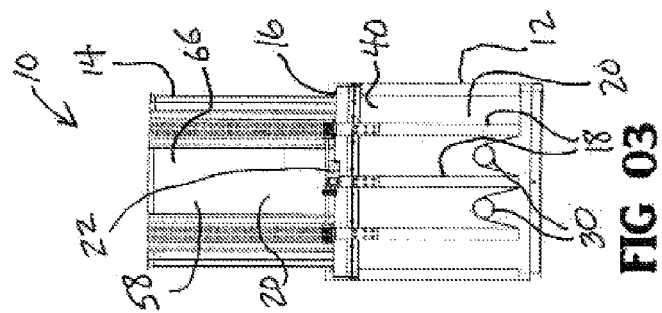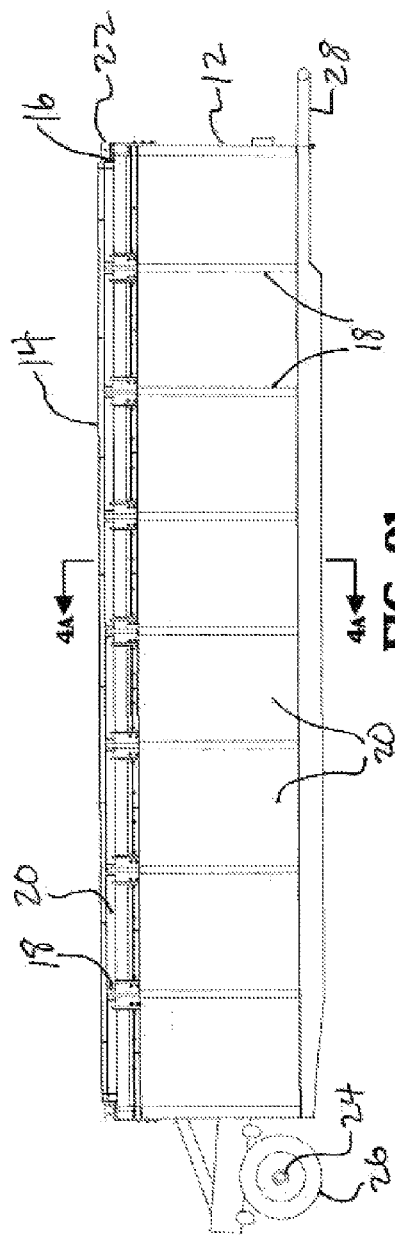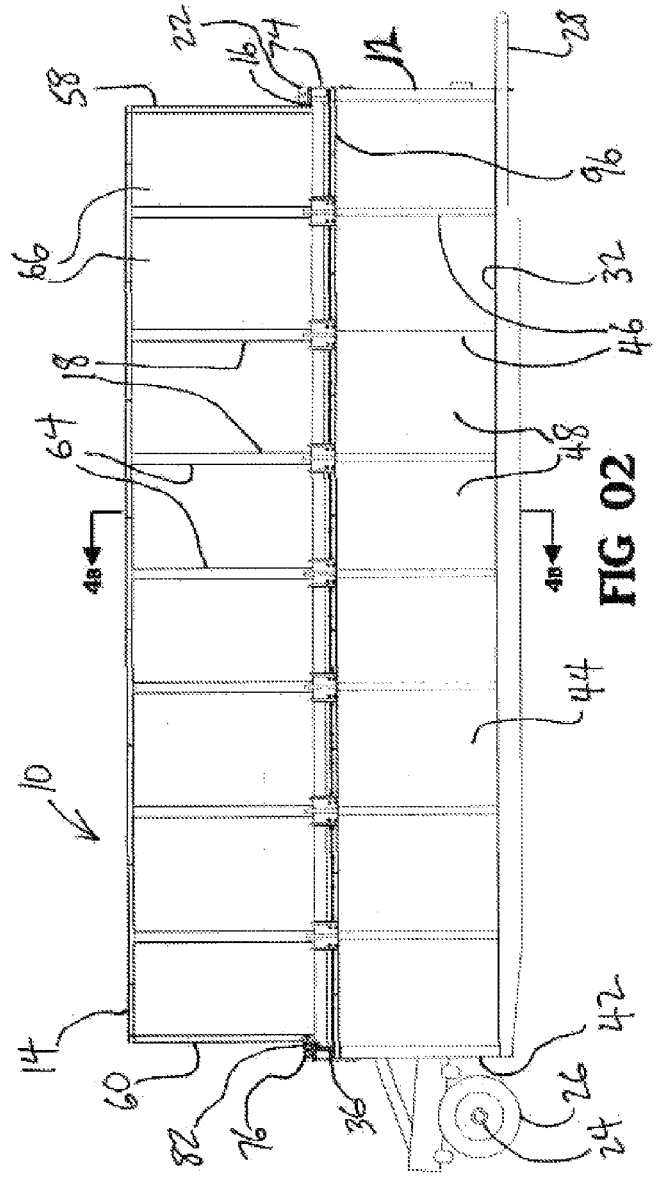

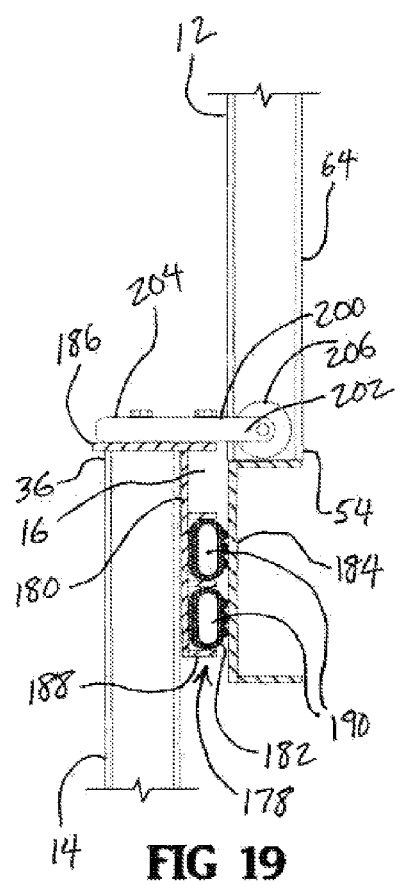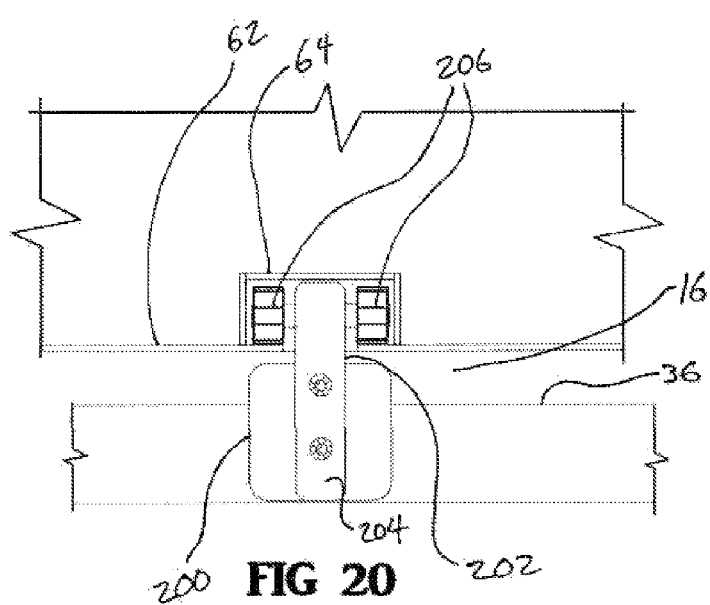

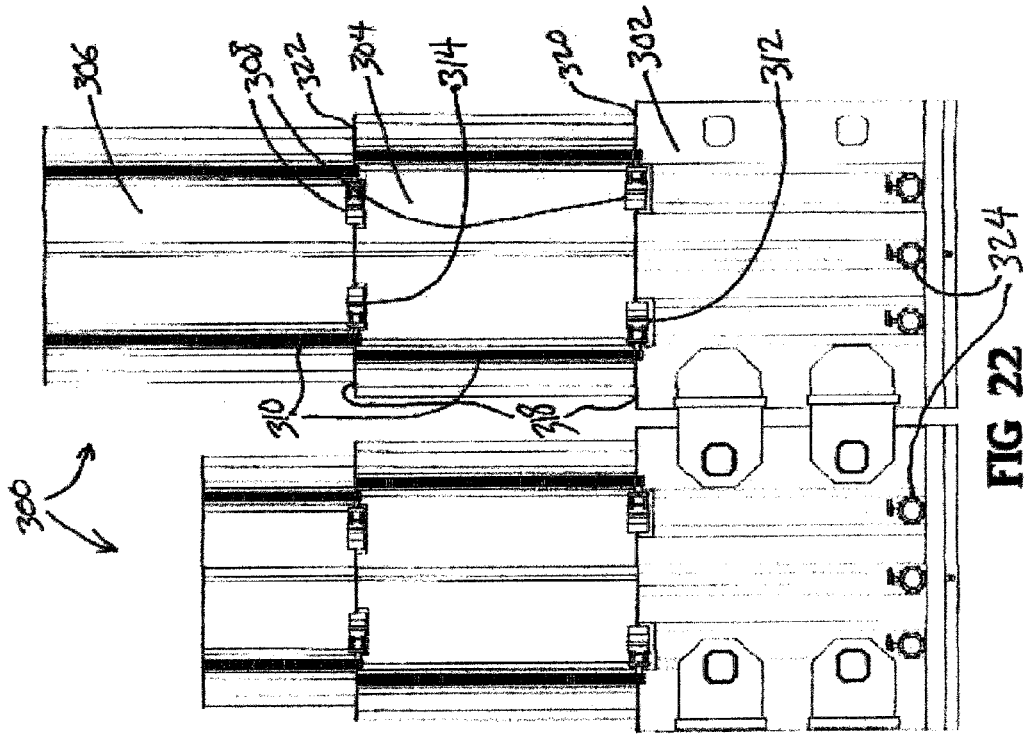
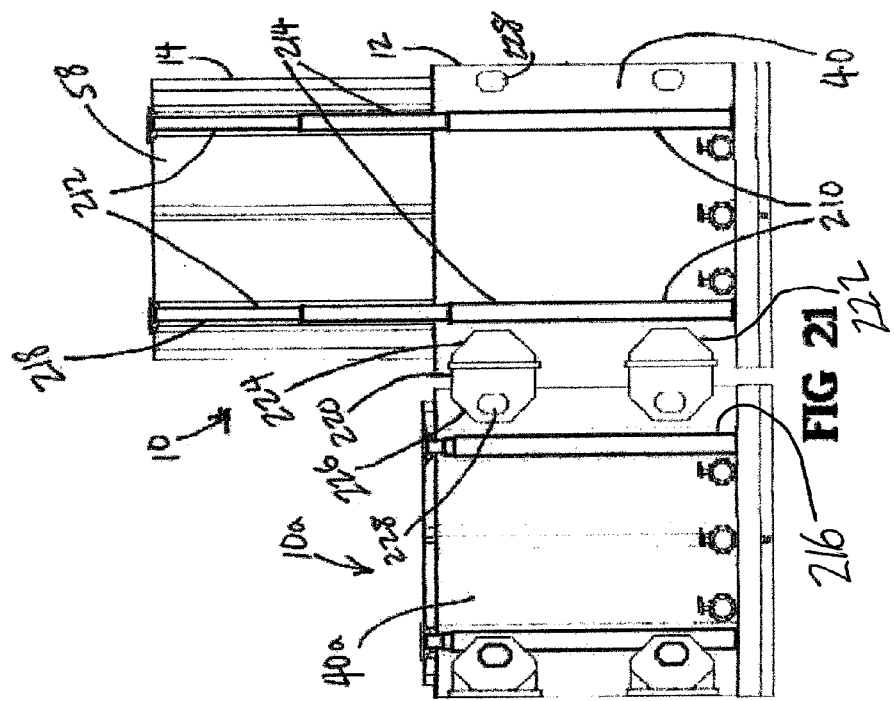

PORTABLE FLUID STORAGE SYSTEM

CROSS REFERENCE TO RELATED APPLICATIONS

This, application claims the benefit of U.S. Provisional Application No. 61/471,793 filed Apr. 5, 2011, and U.S. Provisional Application No. 61/559,235 filed Nov. 14, 2011, the contents of which are incorporated fully herein by reference.

FIELD OF THE INVENTION

The present invention relates to containers used for storing fluids and more particularly to frac tanks used for storing water during hydraulic fracturing operations.

BACKGROUND OF THE INVENTION

Hydraulic fracturing is a regular technique used by energy companies for releasing oil or natural gas from previously drilled wells. High pressure fluids injected into wells creates new fractures or channels in rock that permits an increase in rates of extraction of oil, natural gas, or other substances from the well. The hydraulic fracturing process, or frac job, requires high volumes of water or fluids, mixed with a variety of chemicals and sands, to be injected into the well. The water and other fluids need to be stored on site near the well in preparation for the frac job injection process. Additionally, water and fluids recovered from the well are often required to be stored on site. Large numbers of frac tanks are often used for this purpose.

Frac tanks are traditionally semi-trailer sized storage containers prepared for holding water or other fluids. Tanks typically hold 500 barrels (approximately 21,000 gallons) of fluid. The tanks are transported to the well by being individually towed behind a semi-tractor, where they are positioned at a site physically prepared for the housing of the required number of tanks. The use of frac tanks thus comes with a significant environmental impact. The present invention provides the ability to store additional fluid volumes with reduced environmental impact.

SUMMARY OF THE INVENTION

The present invention is directed to a portable fluid storage container system. The system comprises a lower chamber, an upper chamber, a lift system, and a seal unit. The lower chamber comprises a bottom and at least one side wall secured to the bottom and having a top edge, the top edge defining an open top of the lower chamber. The upper chamber comprises a top and at least one side wall secured to the top and having a bottom edge, the bottom edge defining an open bottom of the upper chamber. The upper chamber is movable between a first collapsed position in which the upper chamber is disposed within the lower chamber and a second extended position in which the upper chamber sits above the lower chamber. The lift system is operatively connected to the lower chamber and the upper chamber, the lift system operable to move the upper chamber between the collapsed position and the extended position. The seal unit is disposed to engage the lower chamber and the upper chamber when the upper chamber unit is in the extended position. When the upper chamber is in the extended position the lower chamber, the seal unit, and the upper chamber define a water tight compartment. The system further comprises a trailer axle and wheels and a trailer tongue. The trailer axle and wheels are connected to the lower chamber, the wheels allowing for rolling support of the lower chamber. The trailer tongue secured to the lower chamber, the tongue permitting the lower chamber to be towed on the wheels.

In an alternative embodiment the invention is directed to a portable fluid storage container system. The system comprises a lower chamber, an upper chamber, a lift system, and a seal unit. The lower chamber comprises a bottom and at least one side wall secured to the bottom and having a top edge, the top edge defining an open top of the lower chamber. The upper chamber comprises a top and at least one side wall secured to the top and having a bottom edge, the bottom edge defining an open bottom of the upper chamber. The upper chamber is movable between a first collapsed position in which the upper chamber is disposed within the lower chamber and a second extended position in which the upper chamber sits above the lower chamber. The lift system is operatively connected to the lower chamber and the upper chamber, the lift system being operable to move the upper chamber between the collapsed position and the extended position. The seal unit is disposed to engage the lower chamber and the upper chamber when the upper chamber unit is in the extended position. When the upper chamber is in the extended position the lower chamber, the seal unit, and the upper chamber define a water tight compartment.

BRIEF DESCRIPTION OF THE DRAWINGS

FIG. 1 is a plan view of a portable fluid storage container system constructed in accordance with the present invention.

FIG. 2 is a plan view of the system shown in FIG. 1 in the container system's extended position.

FIG. 3 is a front view of the system shown in FIG. 2.

FIG. 4B is a partial view of the seal unit embodiment shown in FIG. 14A with the upper chamber in the extended position.

FIG. 19 is a partial view of another alternative embodiment for a seal unit for use with the present invention.

FIG. 20 is a partial top view of the embodiment of FIG. 19 showing guide wheels used with the present invention.

FIG. 21 is an end view of the container system having an alternative embodiment for the lift system.

FIG. 22 is an end view of an alternative embodiment for the container system built in accordance with the present invention.

DETAILED DESCRIPTION OF THE INVENTION

Figure 4A:
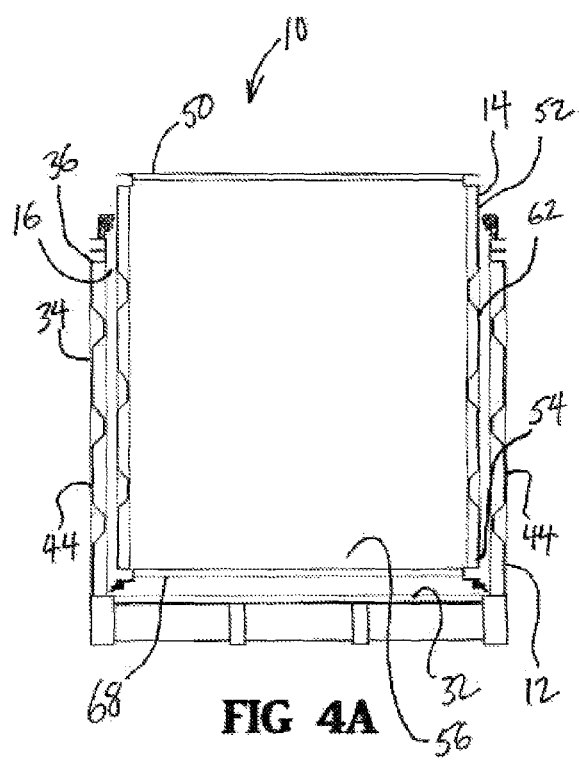
FIG. 4A is a plan view of the container system shown in FIG. 2 taken along cut lines 4-4.

With reference now to the drawings in general and to FIG. 1 in particular, there is shown therein a preferred embodiment for a portable fluid storage system constructed in accordance with the present invention. The storage system, or container system, designated by reference number 10, comprises a lower chamber unit 12 and ah upper chamber unit 14 generally sized to fit within the lower chamber unit so that there is an annulus 16 between the upper chamber unit and the lower chamber unit. In the preferred embodiment, the annulus 16 would be approximately two to six inches wide. Having an annulus 16 of this size allows for optimal operation of the system 10 in ways that are yet to be described. Preferably, the lower chamber unit 12 and the upper chamber unit 14 are tanks and constructed in a manner similar to traditional tanks, comprised of materials appropriate to withstand the rigors of transportation on roads of various repair and the pressures of water or other fluids stored within the container system 10. More preferably, the lower chamber 12 and the upper chamber 14 are comprised of a plurality of steel beams 18 and steel plates 20 welded together. Alternative embodiments will allow for steel of varied thickness or the use of other materials of sufficient rigidity and strength. The use of plastic panels or carbon fiber panels, for example, is contemplated for use with the present invention.

Continuing with FIG. 1, the container system 10 further comprises a lift system 22 operatively connecting the lower chamber 12 and the upper chamber 14. As will be described in greater detail below, the lift system 22 is adapted to move the upper chamber unit 14 between a first collapsed position as shown and a second extended position (as shown and described below in FIGS. 2 and 3). Preferably, the container system 10 is made portable by a trailer axle 24 and wheels 26 secured to the lower chamber 12. More preferably, a trailer tongue 28 is also secured to the lower chamber 12, the tongue being adapted to connect to a semi-tractor (not shown) or other fifth-wheel vehicle in known fashion. Alternatively, the container system 10 may be made portable in other ways, such as with roll-off capabilities. The preferred portable nature of the container system 10 is designed to take advantage of ISO and highway standards to allow for maximum sizing of the container system, as is done with conventional frac tanks. Preferably, the container system 10 will be approximately 40 feet long and 8½ feet wide and approximately 16 feel 8 inches high in the extended position. As shown in FIG. 1, the container system 10 is represented in its transportable configuration, being capable of being hauled or transported to a drilling site or other locale for its use.

After being transported to a drilling site or other locale, the container system 10 is dropped at a substantially level site prepared for parking and using the system. As suggested previously, several container systems 10 may be parked together for use on a frac job or other operation requiring storage of large amounts of fluids. After the container system 10 has been parked, the system is put into its operational configuration. The container system 12 may be put into the operational configuration by operation of the lift system 22 to move the upper chamber 14 to the extended position. Preferably, a power unit (not shown) will be connected to the lift system 22 to provide needed power. More preferably, the power unit is carried on a field truck or the like that is designated to manipulate the container system 10. The power unit may be a hydraulic power unit, electric power supply, or other power supply meeting necessary specifications for powering the lift system 22.

Referring now to FIGS. 2 and 3, the container system 10 is shown in its operational configuration. As shown therein, the upper chamber unit 14 is in the second extended position in which the upper chamber sits substantially above the lower chamber unit 12. In the extended position, a seal unit (yet to be described) disposed to bridge the annulus 16 engages both the upper chamber unit 14 and the lower chamber unit 12. In the operational configuration shown in FIGS. 2 and 3, the lower chamber unit 12, the upper chamber unit 14, and the yet to be described seal unit, define a water tight container. The container system 10 can then be filled and emptied through valves or ports 30 such as those shown in FIG. 3. The container system 10 operationally provides for holding approximately 40,000 gallons of water for a frac job. Other uses beyond frac jobs are also appropriate, such as water storage during drilling operations, production flowback after a frac job, fluid storage for deicing systems at airports, fluid storage in road boring operations, water storage during disaster relief, and other similar needs onuses.

Figure 4B:
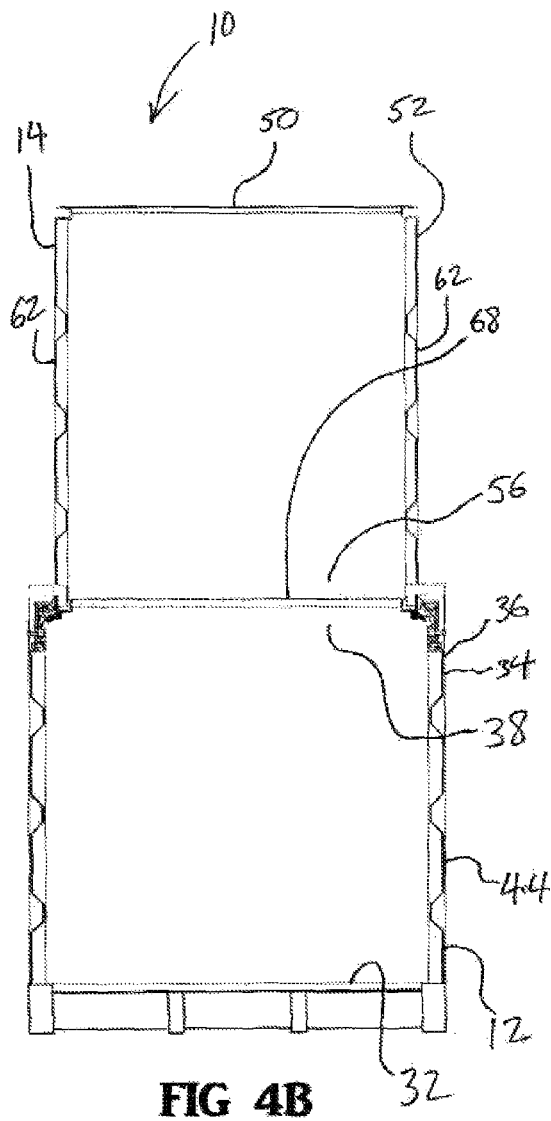
FIG. 4B is a plan view of the system shown in FIG. 4A with the container in the extended position.

With continued reference to FIGS. 2 and 3, and also referring to FIGS. 4A and 4B where there is shown a cut view of the system 10 shown in FIG. 1, the container system is shown and described in more detail. As shown, the lower chamber unit 12 comprises a bottom or floor 32 and at least one side wall 34 secured to the bottom. The bottom 32 preferably comprises a substructure having a plurality, of steel tubular beams and cross pieces supporting steel plates. The at least one side wall 34 has a top edge 36, the top edge defining an open top 38 of the lower chamber unit 12. In the preferred embodiment the lower chamber 12 will have a generally rectangular structure, though a circular or oval shape or other polygonal shapes may also be used. Thus, in the preferred embodiment the at least one side wall 34 comprises a front wall 40, a back wall 42, and a pair of opposing longitudinal side walls 44. Preferably, the front wall 40, the back wall 42, and the longitudinal side walls 44 comprise a plurality of vertical tubular posts 46 or steel c-channel posts. The posts 46 provide structural support for the lower chamber 12 and a connection point for other elements of the container system 10 yet to be described. More preferably, panels 48 or sheets of steel, or skins, are welded or otherwise connected between and to the posts 46 to form surfaces of the walls 40, 42, 44. One skilled in the art will appreciate the walls 40, 42, 44 may also be formed of panels designed with sufficient rigidity to obviate the need for posts, and yet still allow for attachment of other elements of the container system 10.

The upper chamber unit 14 comprises a ceiling 50, or top, and at least one side wall 52 secured to the ceiling. The ceiling 50 preferably comprises one or more panels, and more preferably comprises a plurality of tubular beams and cross pieces supporting the panels. Most preferably, the panels and beams are comprised of steel. The at least one side wall 52 has a bottom edge 54, the bottom edge defining an open bottom 56 of the upper chamber unit 14. In the preferred embodiment the upper chamber 14 will be of a shape and structure substantially the same as that of the lower chamber unit 12. Thus, in the preferred embodiment the at least one side wall 52 comprises a front wall 58, a back wall 60, and a pair of opposing longitudinal side walls 62. The front wall 58, the back wall 60, and the longitudinal side walls 62 comprise a plurality of vertical tubular posts 64 or c-channel posts. The posts 64 provide structural support for the upper chamber 14 and a connection point for other elements of the container system 10 yet to be described. Sheets of steel 66, or skins, are welded or otherwise connected between and to the posts 64 to form surfaces of the walls 58, 60, 62. Additionally, at least one cross beam 68 connected between the opposing side walls 62 across the open bottom 56 of the upper chamber 14. The at least one cross beam 68 will prevent bowing of the upper chamber 14 from fluid pressures when the container system 10 is filled with fluid.

Figure 5:
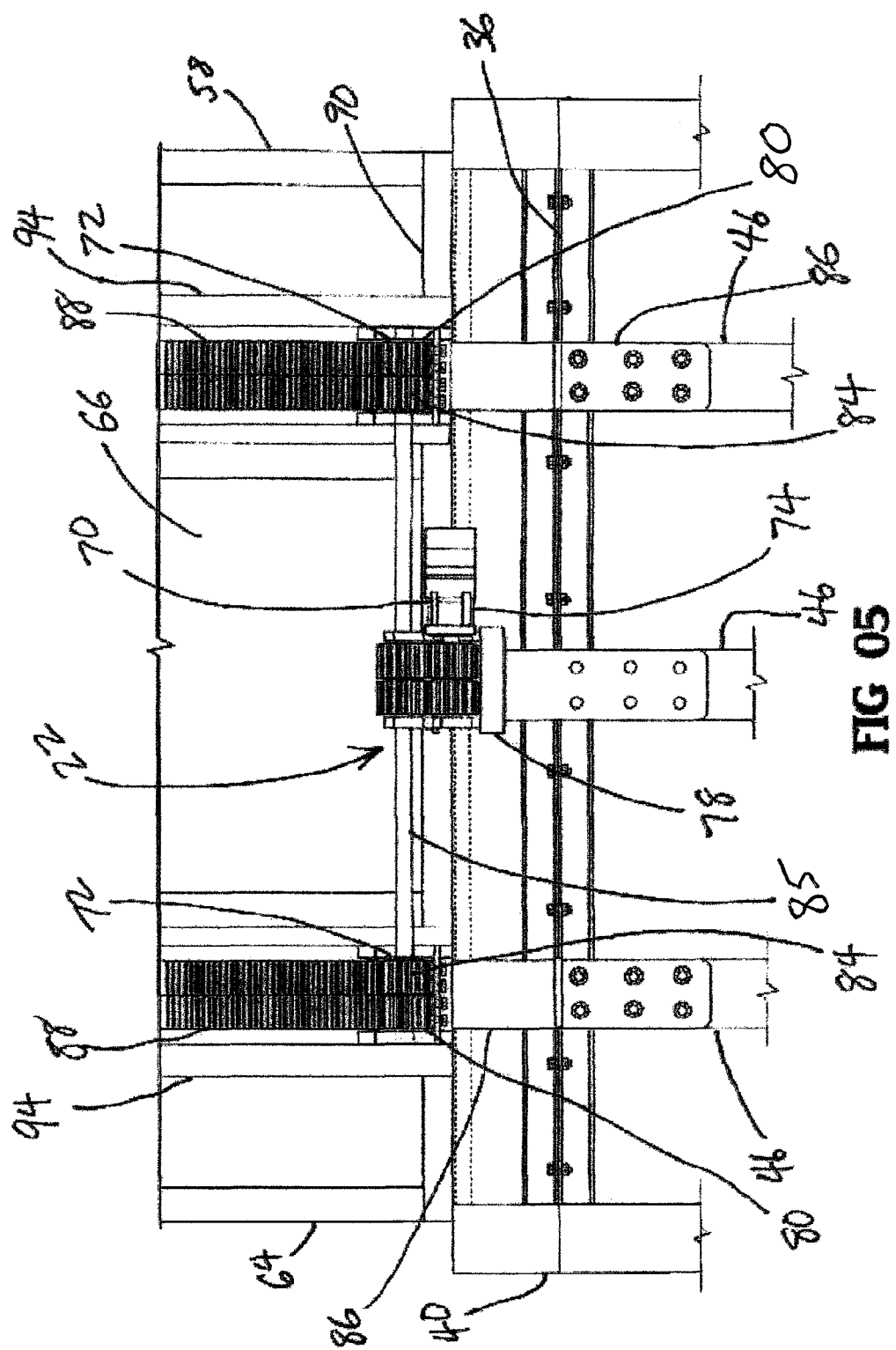
FIG. 5 is a partial plan view of the front wall of upper chamber and the lower chamber, showing a preferred embodiment of the lift system for the present invention.
Figure 6:
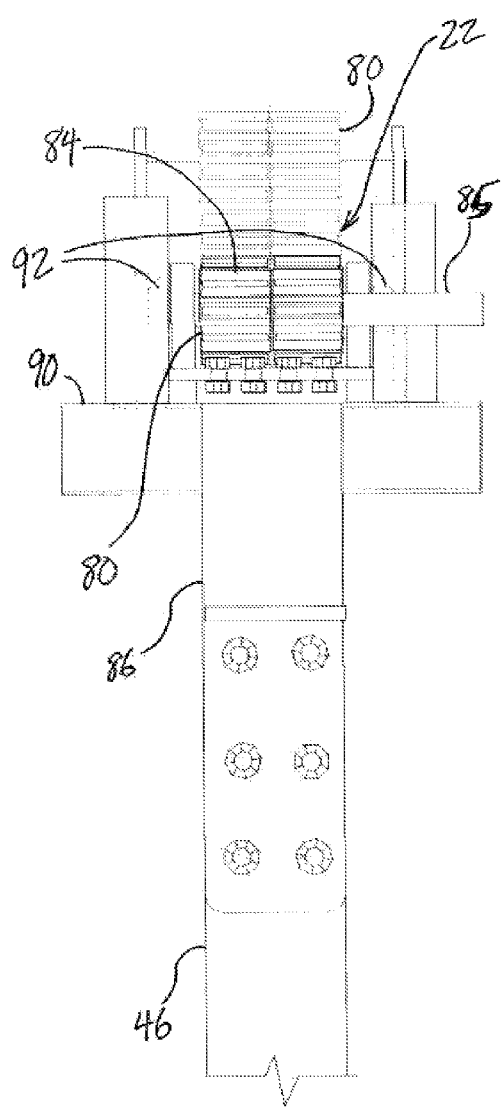
FIG. 6 is an partial plan view of the rack and pinion gear shown in FIG. 5.
Figure 7:
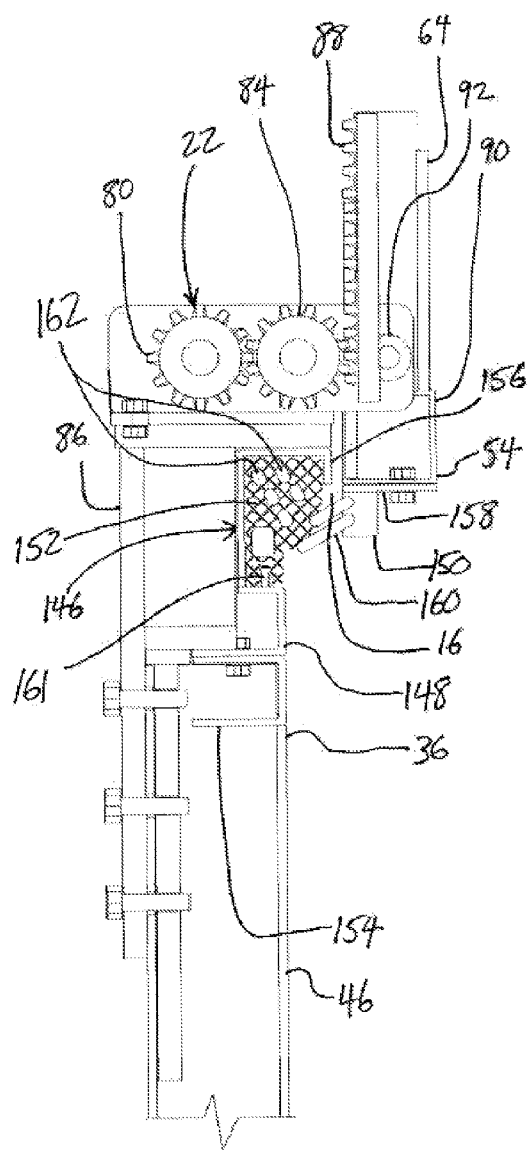
FIG. 7 is a partial side view of the front wall of the upper chamber and the lower chamber, showing the rack and pinion gear of the lift system and the seal unit for the present invention.

Referring now to FIGS. 5-7, a preferred embodiment for the lift system 22 is shown in more detail. The lift system 22 preferably comprises at least one hydraulic motor 70 and a plurality of rack and pinion gear drives 72. More preferably, the at least one hydraulic motor 70 comprises a first motor 74 disposed proximate the top edge 36 of the front wall 40 of the lower chamber unit 12 and a second motor 76 (shown in FIG. 2) disposed proximate the top edge 36 of the back wall 42 of the lower chamber unit 12. The first motor 74 and the second motor 76 are each secured to motor mounts 78. The motor mounts 78 may comprise an L-shaped bracket to provide a horizontal mounting surface for supporting, the motors 74, 76. The motor mounts 78 are removably connected to one of the posts 46 of the front wall 40 and the back wall 42.

The plurality of rack and pinion drives 72 preferably comprise a first pair of rack and pinion drives 80 operatively connected to the first motor 74 and a second pair of rack and pinion drives 82 operatively connected to the second motor 76. The first pair of rack and pinion drives 80 includes a set of spur gears 84 disposed proximate the top edge 36 of the front wall 40 of the lower chamber 12 and operatively connected to the first motor 74 by a drive shaft 85. Preferably, the spur gears 84 are disposed at outer edges of the front wall 40 proximate the opposing longitudinal walls 44. The spur gears 84 may be secured to mounts 86 that are removably connected to posts 46 of the front wall 40, similar to the motor mounts 78 described above. The first pair of rack and pinion drives 80 further includes a set of toothed geared racks 88 connected to the front wall 58 of the upper chamber unit 14. The racks 88 are disposed at outer edges of the front wall 58 of the upper chamber 14 proximate the opposing longitudinal walls 62 so that the spur gears 84 are able to engage the racks. Preferably, the toothed racks 88 would be secured to cross beams 90 of the front wall 58 of the upper chamber 14 to allow the load of the upper chamber to be carried and distributed to the beams. More preferably, the racks 88 may be set in cutouts (not shown) in the beams 90 to allow for the spur gears 84 to properly engage the racks. The second pair of rack and pinion drives 82 is disposed on the back wall 42 of the lower chamber unit 12 and the back wall 60 of the upper chamber unit 14 in a manner similar to the structure of the first pair of rack and pinion drives 80.

Continuing with FIGS. 5-7, the lift system 22 further comprises a plurality of guide wheels 92 rotationally secured to the mounts 86 for the spur gears 84. The guide wheels 92 are positioned to fit within rails 94 that are secured to the walls 58, 60 of the upper chamber 14 adjacent the racks 88. The guide wheels 92 provide for the spur gears 84 to maintain contact with the racks 88, despite the forces the gears place on the racks urging the gears away from the racks.

With reference again to FIG. 2, the lift system 22 further comprises a timing mechanism 96. The timing mechanism 96 provides for the coordination of the motors 74, 76 as the upper chamber unit 14 is moved between the collapsed position and the extended position. In the preferred embodiment the timing mechanism 96 comprises a timing bar, or tie bar, operatively connected between the first motor 74 and the second motor 76. The timing bar 96 is rotatably attached proximate the top edge 36 of one of the opposing longitudinal sides 44 of the lower chamber 12. Thus, as the motors 74, 76 rotate the drive shafts, the timing bar 96 will rotate and act to mechanically coordinate the output of the first motor and the second motor. In an alternative embodiment the timing mechanism 96 may be may comprise an electronic timing system operatively connected to the motors 74, 76. Applicable systems are commercially available and typically comprise a computerized controller in communication with a level sensor that senses the the level of the upper chamber unit 14. If the upper chamber unit 14 is at any time not level, the controller communicates with the first motor 74 and second motor 76 to coordinate output speeds and maintain the level nature of the upper chamber unit. Other mechanisms for maintaining the level nature of the upper chamber 14 as it is lifted are contemplated, such as the use of travel limited by pressure switches.

Figure 8:
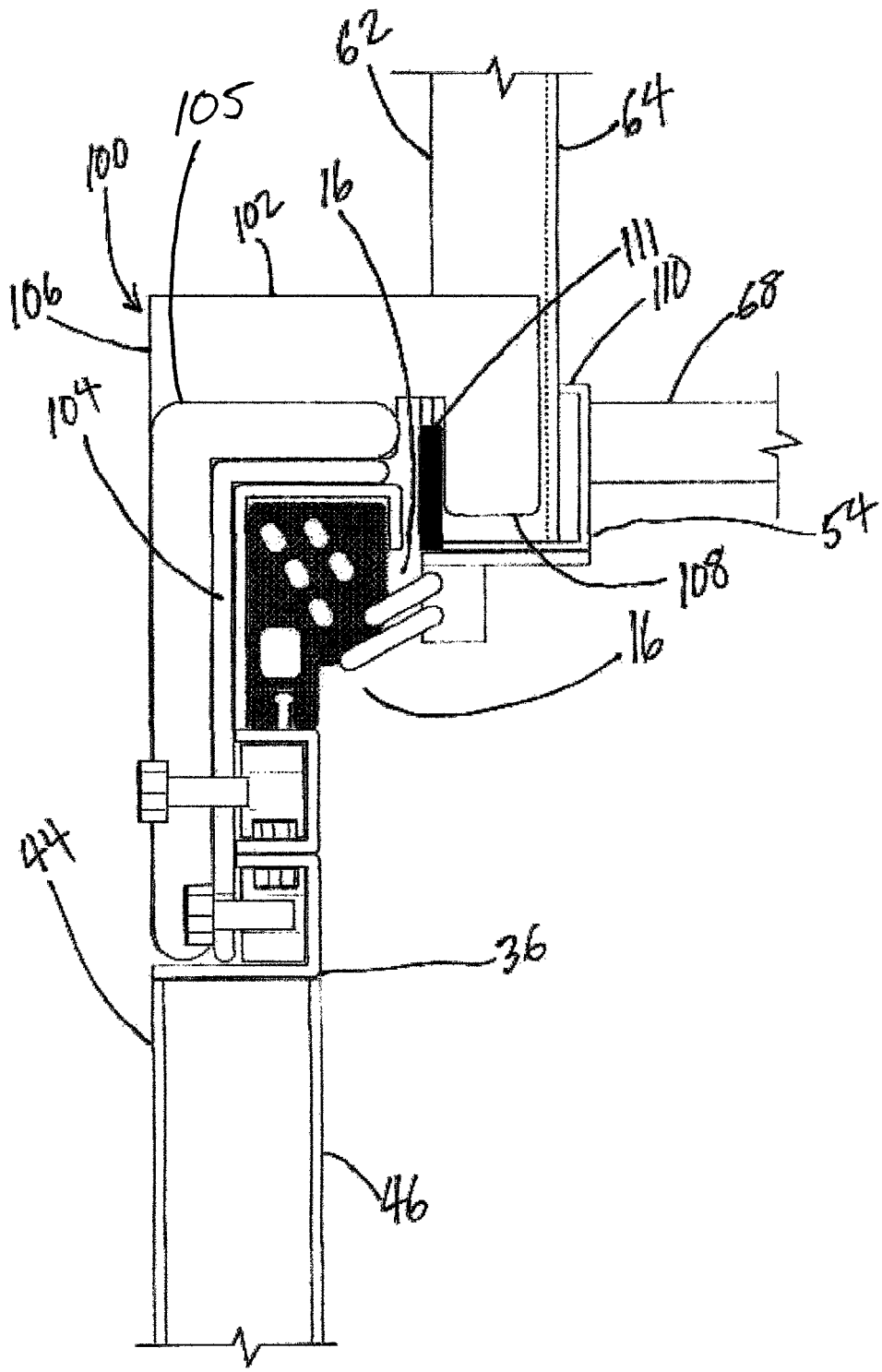

Turning now to FIG. 8, the container system 10 also comprises a bulge preventer 100 secured to the lower chamber 12, adapted to prevent the side walls 44 of the lower chamber from bulging out from forces of fluid when the container system is in use. The bulge preventer 100 comprises a plurality of wall hooks 102 and a corresponding number of hook mounts 104. Preferably at least One hook mount 104 and corresponding wall hook 102 are removably secured to each of the opposing side walls 44. More preferably, each hook mount 104 is attached to one of the posts 46 proximate the top edge 36 of the lower chamber 12. Preferably each hook mount 104 comprises an L-bracket connected to a lower chamber cap (yet to be described), although the hook mount may also be connected to one of the posts 46 of the opposing side walls 44. Each mount 104 provides a connection point for one of the wall hooks 102 to be secured to the top edge 36 of the lower chamber 12. An additional support bracket 105 may be used, with on the mount 104 to help distribute loads from forces exerted by the fluid when the container system 10 is in use.

Each wall hook 102 comprises an extension arm 106 secured to the mount 104 and extending distally across the annulus 16. A hook 108 at the distal end of the arm 106 is positioned to travel in one of the posts 62 or c-channels of the opposing side walls 64 of the upper chamber 14. When the upper chamber 14 is moved to the extended position as shown in FIG. 8, the hook end 108 of the wall hook 102 is set in a recess in a beam 110 at the bottom edge 54 of upper chamber 14. An additional plate 111 may be used in the beam 110 to retain the hook 102. The wall hook 102, in conjunction with the cross beam 68 of the upper chamber 14, prevents the opposing side walls 44 of the lower chamber 12 from bowing when the container system 10 is filled with fluid.

Figure 10:
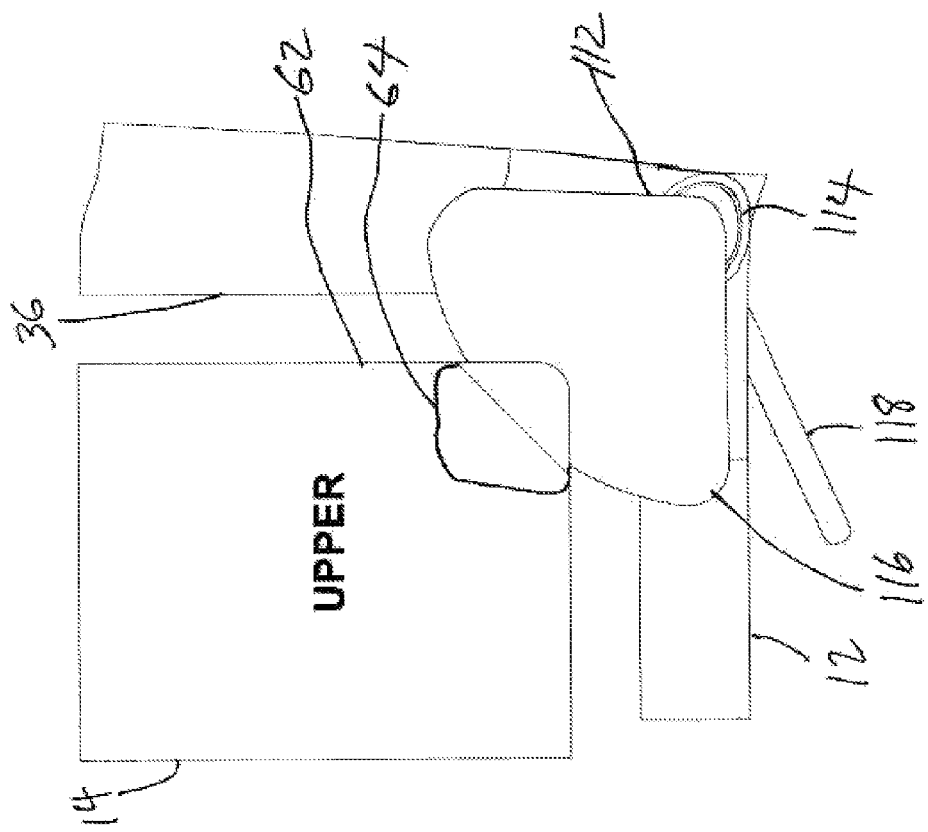
FIG. 10 is a partial top view of the lock system for use with the present invention showing the lock in the locked position.
Figure 9:
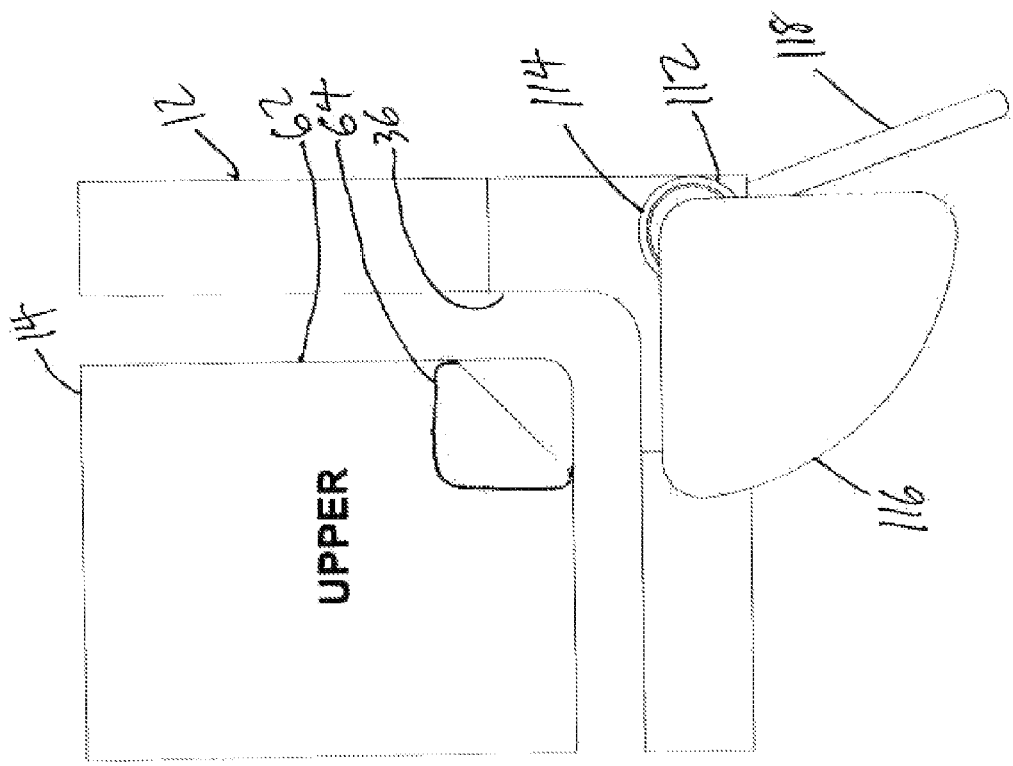
FIG. 9 is a partial top view of the lock system for use with the present invention.

The present invention also provides for the upper chamber 14 to be locked in the extended position. As shown in FIGS. 9 and 10, the container system 10 further comprises a mechanical lock 112 to secure the upper chamber 14 in the extended position. The lock 112 comprises a pin 114 rotatably attached proximate the top edge 36 of the lower chamber unit 12, a plate 116 secured to a first end of the pin, and a handle 118 secured to a second end of the pin. In operation, the lock 112 is movable between an open position (shown in FIG. 9) and a locked position (shown in FIG. 10). The lock 112 is preferably rotated to the locked position when the upper chamber 14 has been moved to the extended position. As the lock 112 is rotated, the plate 116 is moved from a position at the top edge 36 of the lower chamber 12 to the locked position over the open top 38 of the lower chamber. In the locked position, the plate 116 will reside in a cut out or void in one of the walls 62 or posts 64 of the upper chamber unit 14. The lift system 22 can then be lowered slightly to allow the upper chamber unit 14 to engage the plate 116, so that the upper chamber cannot lower further. In the preferred embodiment, four locks 112 will be used, one disposed at each of the corners of the lower chamber unit 12. Other systems for locking the upper chamber 14 in the extended position contemplated, such as a gear lock for the rack and pinion drives.

Figure 11:
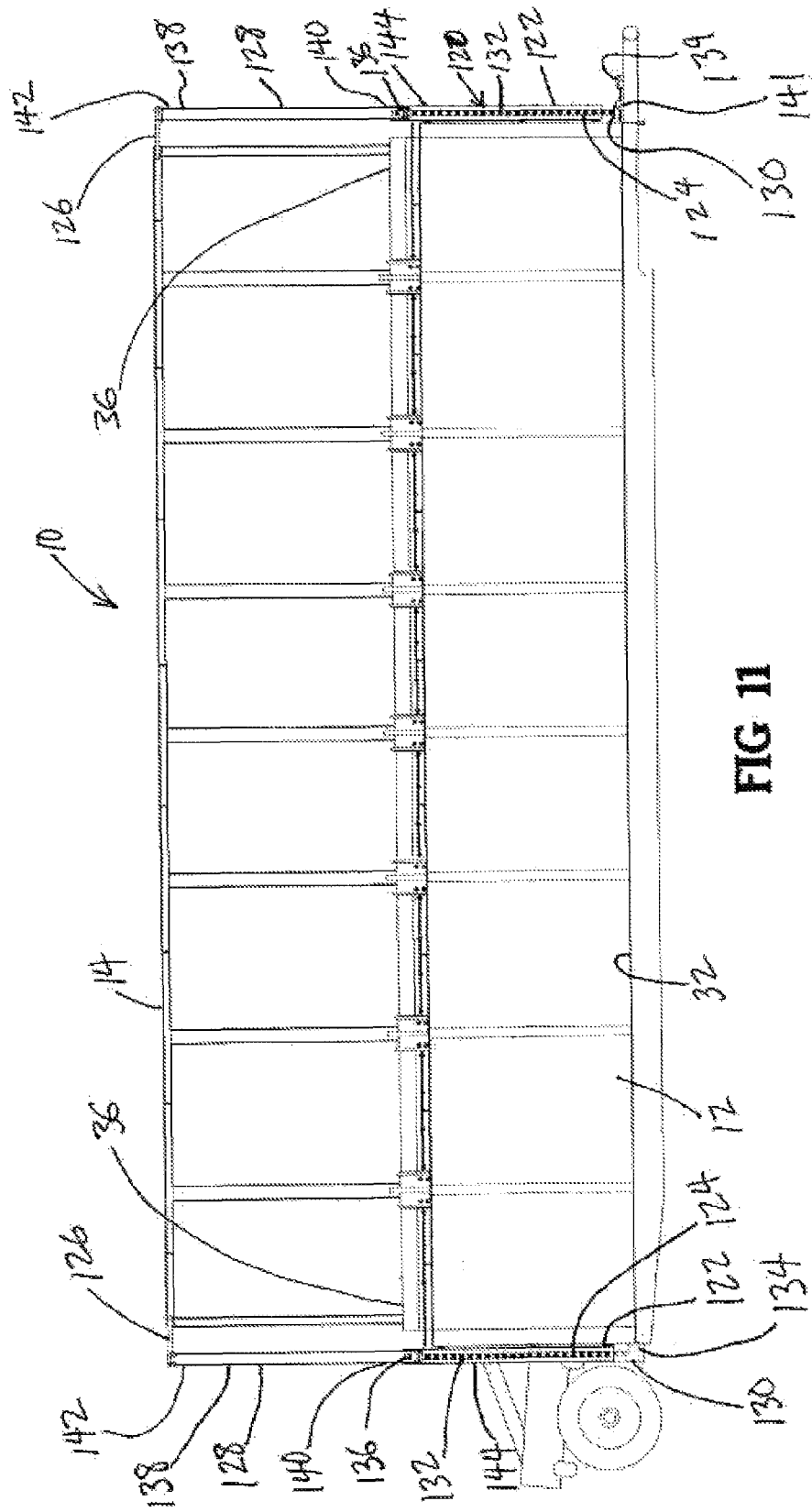
FIG. 11 is a side plan view of the container system with an alternative embodiment for a lift system.

Referring now to FIG. 11, an alternative embodiment for a lift system 120 built in accordance with the present invention is shown. In the alternative embodiment, the lift system 120 comprises a plurality of jack arrangements 122 disposed around a perimeter of the container system 10 to lift the upper chamber 14 to the extended position and lower it to the collapsed position. Preferably, the plurality of jack arrangements 122 comprises four hydraulically driven jack arrangements, one each disposed at each of four corners of the container system 10. Each jack arrangement 122 comprises a screw jack 124, a lift plate 126, and a lift post 128. The screw jacks 124 comprise a base motor 130 and a screw post 132 operatively connected to the motor. The base motors 130 are each preferably secured to a tank base mount 134 securable proximate the bottom 32 of the lower chamber 12. The screw posts 132 are positioned to extend from the base motor 130 up to a position proximate the top edge 36 of the lower chamber 12.

Figure 12:
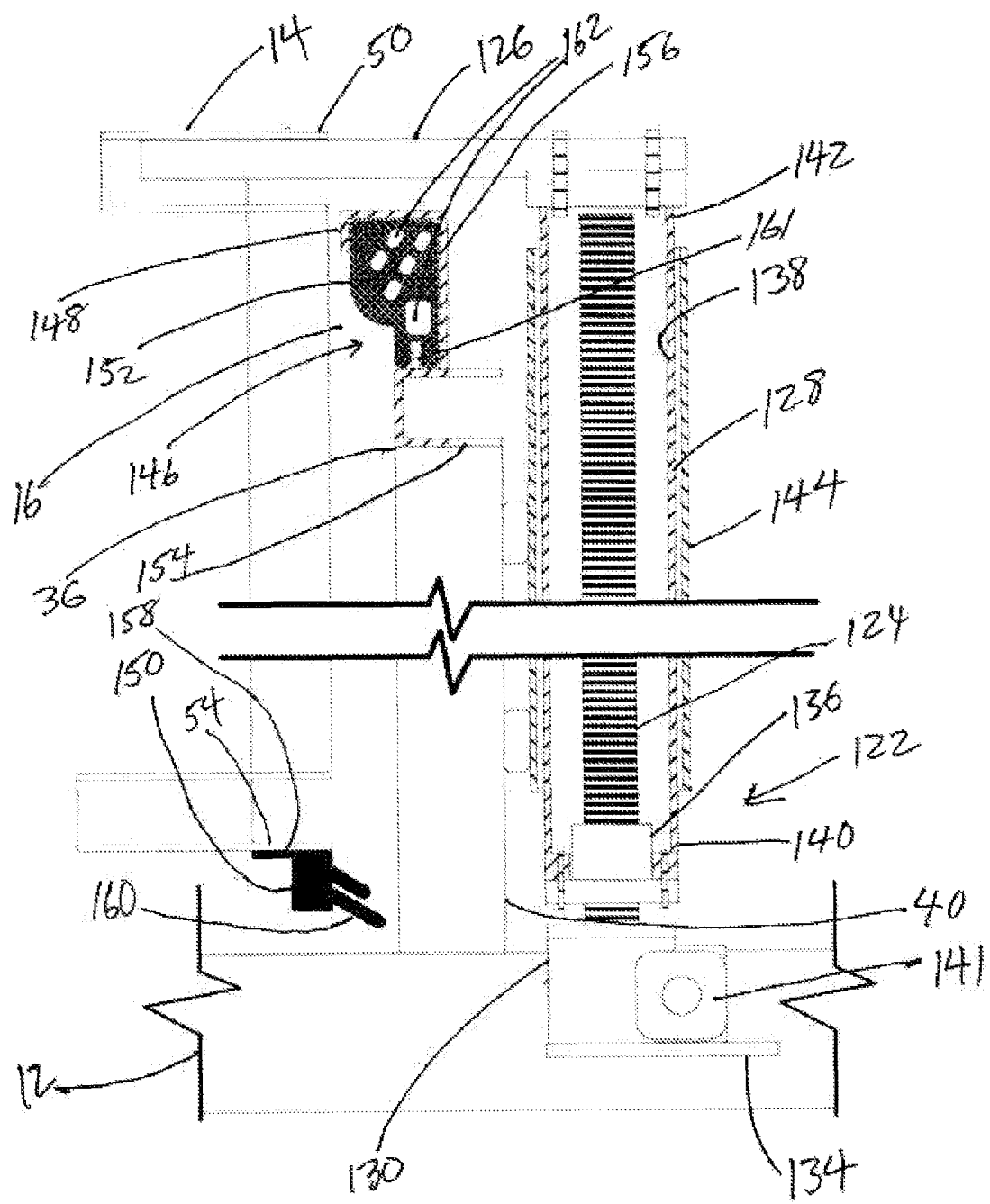
FIG. 12 is a partial view of the embodiment of the lift system for the system shown FIG. 11.
Figure 13:
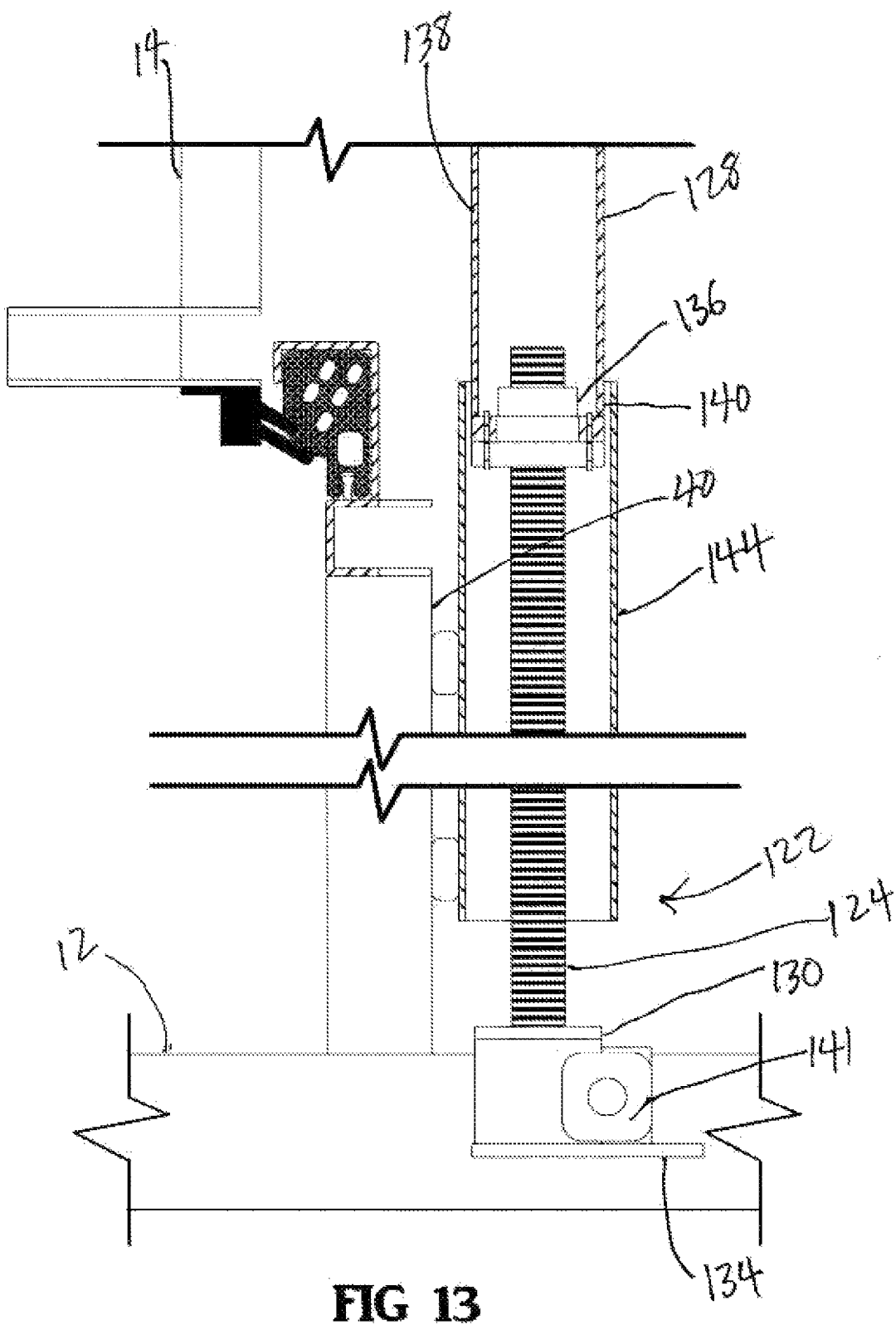
FIG. 13 is a partial view of the embodiment of the lift system for the system shown FIG. 11 with the upper chamber in the extended position

With reference now to FIGS. 12 and 13, the jack arrangements 122 are shown in greater detail. The lift plates 126 have a tank attachment surface for securing the plates to the top 50 of the upper chamber 14. Preferably the plates 126 will be of sufficient size and secured so that the plates may bear the weight of the upper chamber 14 as it is moved. The lift posts 128 comprise a traveling nut 136 and a lift column 138. The traveling nut 136 is sized to screw onto the screw post 132. The lift column 138 preferably comprises a tubular column of sufficient diameter to be disposed over the screw post 132. A first end 140 of the lift column 138 is secured to the traveling nut 136. A second end 142 of the lift column 138 is secured to the lift plate 126. Preferably, each jack arrangement 122 will also comprise a protective sleeve 144 secured to the front wall 40 or back wall 42 of the container system 10. The protective sleeve 144 allows for the screw post 132 to be sheltered from environmental elements.

In operation, the base motor 130 turns the screw post 132, causing the traveling nut 136 to move "up" the screw post. As the nut 136 moves up the post 132, the lift column 138 also travels upward pushing the lift plate 126 and the upper chamber 14 to the extended position. Among other benefits, the jack arrangements 122 provide for an Inherent lock when the upper chamber 14 is in the extended position, and allowing the container system 10 to be used with the upper chamber only partly extended if desired.

As with the rack and pinion system 72 previously described, the operation of the plurality of jack arrangements 122 does need to be coordinated to ensure the upper chamber 14 is raised in a substantially level manner. Preferably, at least one drive motor 139 is again used to drive the base motors of the jack arrangements 122. As was described with the rack and pinion system 72, the drive motor 139 can be tied to the jack arrangement 122 at both ends of the container system 10 using a timing bar 141, an electronic control system, or the like.

With reference again to FIG. 7 and also to FIG. 12, the seal unit 146 of the container system 10 is shown in greater detail. The preferred embodiment for the seal unit 146 comprises a lower chamber flange 148 connectable to the lower chamber unit 12, an upper chamber flange 150 connectable to the upper chamber unit 14, and a seal 152 disposed to engage the top unit flange and the lower chamber flange when me upper chamber unit is in the extended position. The lower chamber flange 148 is preferably disposed at the top edge 36 of the lower chamber unit 12. The lower chamber flange 148 preferably comprises a lower chamber cap 154 and a flange bracket 156. The lower chamber cap 154, or edge cap, has an attachment surface that is secured to the top edge 36 of the lower chamber 12, around a full perimeter of the lower chamber. Preferably the lower chamber cap 154 is a steel c-channel that is welded at the top edge 36 of the lower chamber 12. The flange bracket 156 is removably attached to the lower chamber cap 154. The flange bracket 156 extends from the lower chamber cap 154 into the open top 38 of the lower chamber unit 12, at least partially bridging a gap that is the annulus 16 between the lower chamber and the upper chamber 14.

The upper chamber flange 150 is preferably disposed at die bottom edge 54 of the upper chamber unit 14. The upper chamber flange 150 preferably comprises a flange plate 158 and a flange extension 160 or sealing surface. The flange plate 158 is preferably removably secured to the bottom edge 54 of the upper chamber 14, around a full perimeter of the upper chamber. The flange extension 160 is secured to the flange plate 158. The flange extension 160 extends front the flange plate 158 away from the open bottom 56 of the upper chamber unit 14, at least partially bridging the gap that is the annulus 16 between the lower chamber 12 and the upper chamber. One skilled in the art will appreciate the flange extension 160 extends a distance sufficient to overlap the flange bracket 156. Preferably the flange extension 160 will extend in a direction down and away from the bottom edge 54 of the upper chamber unit 14, minimizing the collection of foreign materials on the sealing surface of the flange extension 160. More preferably the flange extension 160 will also comprise a plurality of scaling surfaces.

The seal 152 preferably comprises a rubber gasket or ring sized to fit beneath the flange bracket 156 and having a length to allow for the seal to fit around the full perimeter of the the flange bracket. More preferably die seal 152 is secured to the flange bracket 156, by use of bolts or an adhesive or in other known manner. Additionally, a ridge 161 or plurality of pins on the flange bracket 156 may be used to aid in retention of the seal 152 in position in the flange bracket. In this configuration, the flange extension 160 will contact and impinge upon the seal 152 when the upper chamber unit 14 is in the extended position. One skilled in the art will appreciate that the positioning and configuration of the flange bracket 156, the seal 152, and the flange extension 160 will permit the flange bracket, the seal, and the flange extension to create a sufficiently tight seal of the annulus 16 between the lower chamber unit 12 and the upper chamber unit 14 when the upper chamber is in the extended position.

One skilled in the art will appreciate that although the preferred embodiment for the seal 152 is a rubber gasket or ring, alternative materials or configurations are anticipated. For example, the seal 152 may comprise compression chambers 162 to allow for the seal to compress when the flange extension 160 contacts the seal. The seal 152 may also comprise multiple pieces of rubber fitted together to comprise the full length of the seal. Alternative materials, such as foam, pliable plastics, or other rubber-like compositions, are also contemplated.

With continued reference to FIGS. 7 and 12, one skilled in the art will appreciate the ease with which the lift system 22, 120 and the seal unit 146 can be separated from the container system 10. The lift system 22, 120 and the seal unit 146 may be combined in the form of a lift and seal kit. Both the lift system 22, 120 and the seal unit 146 as described are removably attached to the container system 10, preferably with a bolting attachment. For example, the mounts 78, 86 for the spur gears 84 and motors 74, 76 are preferably bolted to posts 46 on the lower chamber 12, and the spur gears and motors are preferably bolted to the mounts. Additionally, the lower chamber flange 148 and the upper chamber flange 150 are preferably bolted to the lower chamber 12 and the upper chamber 14 respectively. Additionally, the flange bracket 156 of the seal unit 146, for example, is preferably bolted to the bottom unit cap 154. Thus, the flange bracket 156, and the seal 152 attached to the bracket, can be easily removed for replacement or assessment of the seal. The preferred structures for the lift and seal kit, the lift system, and the seal unit allow for parts of the container system 10 to be removed for inspection, repair, replacement, or other objectives.

Figures 14A, 14B:
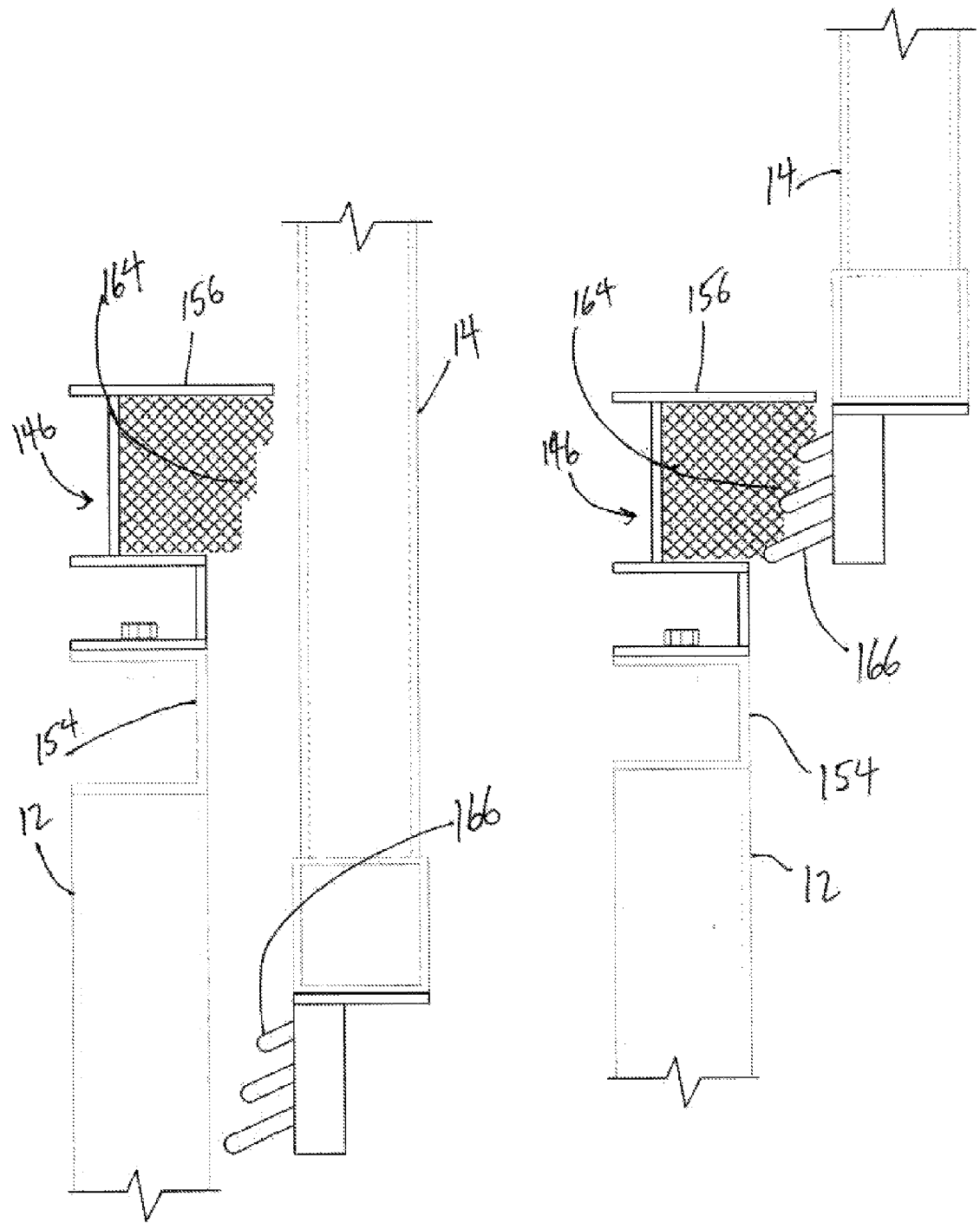
FIG. 14A is a partial view of an alternative embodiment for a seal unit for use with the present invention.

The present invention contemplates alternative embodiments for the seal unit 146. Turning now to FIGS. 14A and 14B, there is shown therein an alternative embodiment for a seal 164 and flange extension 166 of the seal unit 146. As shown in FIG. 14A, the seal 164 comprises a gasket or ring secured to the flange bracket 156. Preferably, the seal 164 has a stepped configuration with a plurality of steps in a surface to be contacted by the flange extension 166. More preferably the plurality of steps comprises three steps, arranged in a manner sloping from proximate the lower chamber cap 154 in a direction up and out into the annulus 16. Similarly the flange extension 166 preferably comprises three extension pieces or fingers to mate with the steps of the seal 164 when the upper chamber 14 is in the extended position (FIG. 14B). More preferably, the extension pieces of the flange extension 166 will be of varied lengths to allow the extensions to contact each of the steps of the seal 164.

Figure 15:
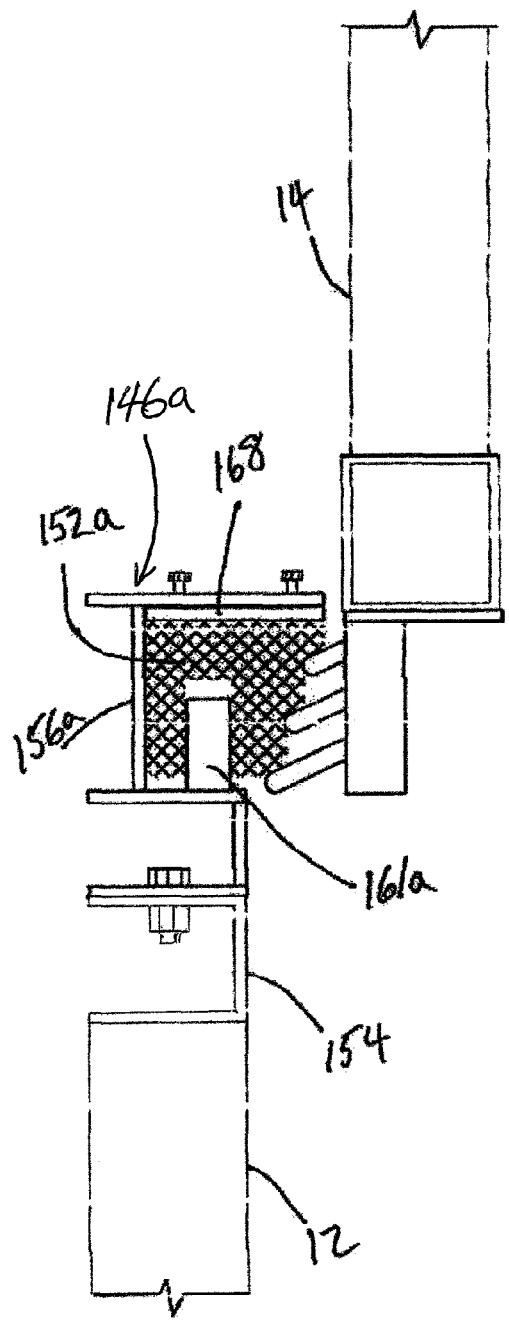
FIG. 15 is a partial view of another alternative embodiment for a seal unit for use with the present invention.

Referring now to FIG. 15, illustrated therein is an alternative embodiment for the seal unit 146a for use with the container system 10. The seal unit shown in FIG. 15 provides an alternative mode for attaching the seal 152a to the flange bracket 156a. In the alternative embodiment shown, the seal 152a is secured, preferably by gluing or with another adhesive, to an attachment plate 168. The attachment plate 168 is subsequently secured to the flange bracket 156a. The attachment plate 168 is removably secured to the flange bracket 156a, preferably by use of bolts. The seal unit 146a shown in FIG. 15 also shows a ridge 161a welded or otherwise secured to the flange bracket, the ridge allowing for positioning and retention of the seal 152a.

Figure 16:
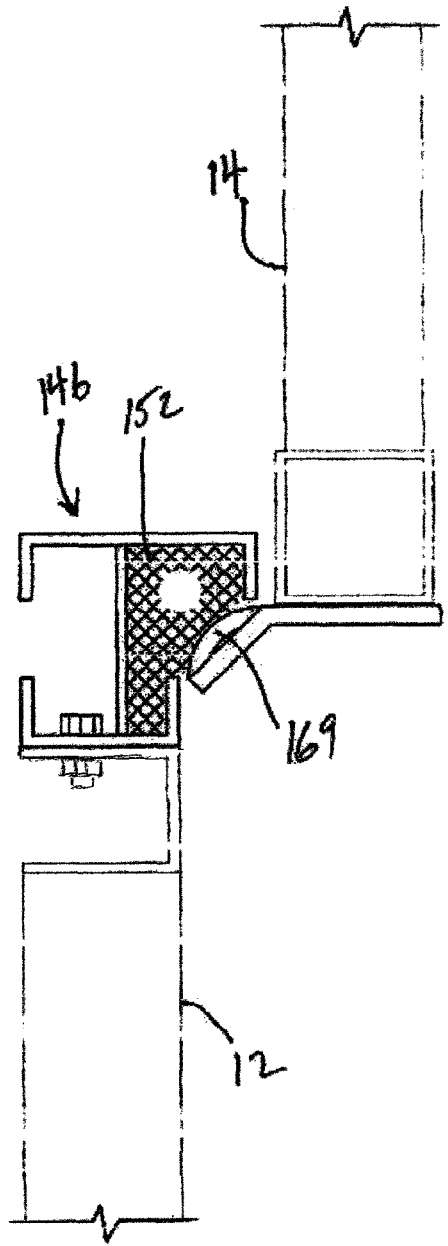
FIG. 16 is a partial view of another alternative embodiment for a seal unit for use with the present invention.

As shown in FIG. 16, an alternative embodiment for the flange extension 169 of the seal unit 146 is shown. As shown therein, the flange extension 169 comprises a convex surface. The convex surface allows additional surface area to be in contact with the seal 152. One skilled in the art will appreciate the additional surface area may allow for a consistent seal and provide for a water tight compartment.

Figures 17, 18:
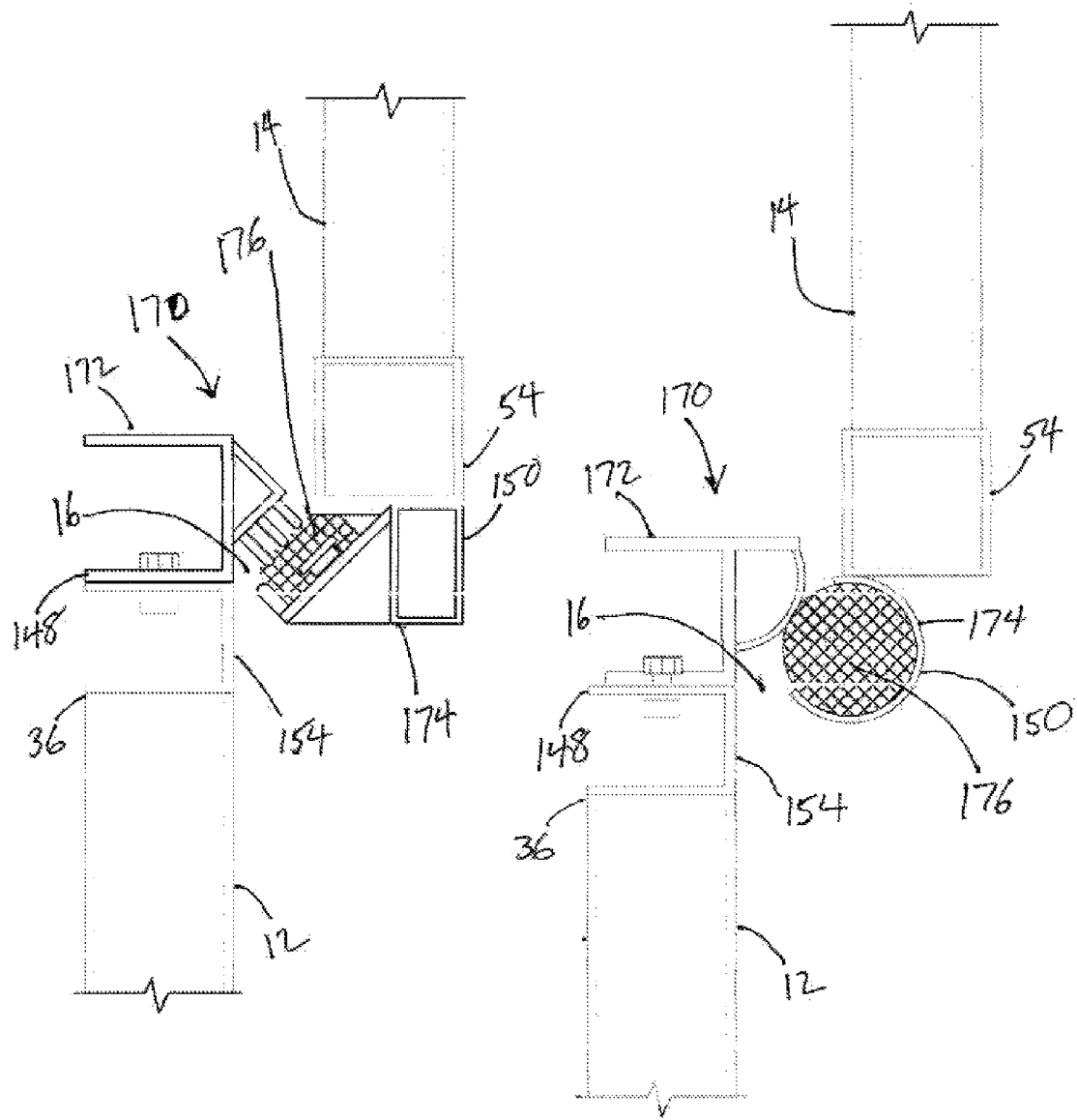
FIG. 17 is a partial view of an alternative embodiment for a seal unit for use with the present invention with the seal attached to the upper chamber.
FIG. 18 is a partial view of another alternative embodiment for a seal unit with the seal attached to the upper chamber

Turning now to FIGS. 17 and 18, additional alternative embodiments for a seal unit 170 of the container system 10 are shown. In the embodiments shown in FIGS. 17 and 18, the seal unit 170 comprises the lower chamber flange 148 and the upper chamber flange 150. The lower chamber flange comprises a flange extension 172 secured to the lower chamber cap 154 at the top edge 36 of the bottom chamber 12. The flange extension 172 preferably extends at least partially into the annulus 16. A flange bracket. 174 is secured to the bottom edge 54 of the upper chamber 14. The flange bracket 174 may be secured by welding or removably secured by bolts or other means. The flange bracket 174 extends from the bottom edge 54 of the upper chamber 14 at least partially into the annulus 16, a sufficient distance to overlap and contact the flange extension 172. In each of the embodiments of FIGS. 17 and 18, a seal 176 is secured to the flange bracket 174, providing a surface for contact with the flange extension 172 when the upper chamber 14 is in the extended position (as shown).

With reference now to FIG. 19, an alternative embodiment for a seal unit 178 is shown. The seal unit 178 of FIG. 19 comprises a lower chamber flange 180, a seal 182 and an upper chamber flange 184. The lower chamber flange 180 comprises a mount arm 186 securable to the top edge 36 of the bottom chamber 12. The lower chamber flange 180 further comprises a support arm 188 extending from the mount arm 186 into the annulus 16. The upper chamber flange 184 is secured to the bottom edge 54 of the upper chamber 14 such that when the upper chamber 12 is in the extended position, the upper chamber flange 184 provides a flange extension and sealing surface opposing the lower chamber flange 180. The seal 182 comprises at least one inflatable bladder 190 supported on the lower chamber flange 180. The inflatable bladder 190 may comprise a bag or other like device that increases in size when injected with air or fluid, and decreasing in size when air or fluid in the bladder is removed. When the upper chamber 14 is moved to the extended position, the bladder 190 is injected with air or fluid to increase its size such that the bladder fills space in the annulus 16 between the lower chamber flange 180 and the upper chamber flange 184, creating the desired seal.

Continuing with FIG. 19 and with, reference also to FIG. 20, the container system 10 further comprises a chamber alignment system 200. The chamber alignment system 200 comprises a plurality of roller guides 202. The roller guides 202 each comprise an arm 204 secured to the top edge 36 of the bottom chamber 12, the arm extending over the open top 38 of the bottom chamber, and across the annulus 16. At least one roller wheel 206 is attached to an end of the arm 204 over the open top 38. The arm 204 is of sufficient length to allow the roller wheel 206 to be contained within one of the posts 64 of the walls 62 of the upper chamber 14. The roller wheels 206 function to guide and maintain a position of the upper chamber 14 as the upper chamber is moved between the collapsed position and the extended position.

Referring now to FIG. 21, there is shown therein an end view of the container system 10 having an alternative embodiment for a lift system 210. The lift system 210 of the present embodiment comprises a plurality of hydraulic cylinders 212. Preferably, the plurality of cylinders 212 includes a first pair of cylinders 214 proximate the front wall 40 of the container system 10 and a second pair of cylinders (not shown) proximate the back wall 42 of the container system. For each hydraulic cylinder of the first pair of cylinders 214, a barrel 216 of the cylinder is secured to the front wall 40 of the lower chamber 12. A piston 218 of the cylinder 214 is secured to the front wall 58 of the upper chamber 14. Similarly, the second pair of cylinders is secured to the back wall of the lower chamber and the back wall of the upper chamber. The cylinders can then be extended and retracted to move the upper chamber 14 between the collapsed position and the extended position, as both are shown in FIG. 21. Alternative mechanisms for a lift system to be used with the present invention are contemplated. For example, a scissor lift may used with the base of the lift secured to the lower chamber and the upper portion of the scissor lift secured to the upper chamber.

Continuing with FIG. 21, a pair of container systems 10 are shown as the containers may be deployed for use. When multiple container systems 10 are used, it may be desirable to lock the containers together for added stability. For that purpose, the container system 10 further comprises a stability system 220. The stability system 220 comprises at least one hinged plate 222. A mounting plate 224 of the hinged plate 222 is secured to the front wall 40 of the lower chamber 12. A swing plate 226 of the hinge 222 then may be secured to a front wall 40a of an adjacent container system 10a. The container system 10a may also comprise a connection point 228 for the swing plate 226 to connect with. Preferably, two hinged plates 222 are used to secure multiple container systems 10 and 10a. More preferably, additional plates or stability system components may be used at the back walls of the container systems 10 and 10a. Alternative embodiments for the stability system are also contemplated. For example, the stability system may comprise at least one bar, rail, or other like structure to be secured to two adjacent systems.

With reference now to FIG. 22, an end view of a three tiered embodiment of the present invention is shown. In the embodiment of FIG. 22, the container system 300 comprises a lower chamber unit 302, a middle chamber unit 304 and an upper chamber unit 306. The middle chamber unit 304 is generally sized to fit within the lower chamber unit 302 so that there is an annulus between the middle chamber unit and the lower chamber unit. The upper chamber unit 306 is generally sized to fit within the middle chamber unit 304 so that there is an annulus between the middle chamber unit and the lower chamber unit. Preferably, the lower chamber unit 302, the middle chamber unit 304, and the upper chamber unit 306 are comprised of materials appropriate to withstand the rigors of transportation on roads of various repair and the pressures of water stored within the container system 300. More preferably, the lower chamber 302, the middle chamber 304, and the upper chamber 306 are comprised of a plurality of steel beams and steel plates welded together. Alternative embodiments will allow for steel of varied thickness or the use of other materials of sufficient rigidity and strength.

Continuing with FIG. 22, the container system 300 further comprises a lift system 308 operatively connecting the lower chamber 302, the middle chamber 304, and the upper chamber 306. The lift system 308 is adapted to move the upper chamber unit 306 and the middle chamber unit 304 between a collapsed position and an extended position. The lift system 308 may be used to selectively or incrementally extend the middle chamber 304 and the upper chamber 306 to allow for increased capacity over the system 300 in a transportable configuration. As shown in FIG. 22 the lift system 308 will preferably comprise a plurality of hydraulically driven rack and pinion systems 310 similar to the system 22 described for the container system 10 shown in FIG. 1. Preferably, at least one rack and pinion system 312 is disposed between the lower chamber 302 and the middle chamber 304 and at least one rack and pinion system 314 is disposed between the middle chamber 304 and the upper chamber 306. More preferably, the plurality of rack and pinion systems 312, 314 would be operated using an electronic control system (not shown) to allow for coordinated and selective extension of the middle chamber and/or the upper chamber.

The container system 300 further comprises a seal unit 318 to provide a seal 320 between the lower chamber 302 and the middle chamber 304, and a seal 322 between the middle chamber 304 and the upper chamber 306. Preferably, the seal unites 18 used will comprise structure similar to the seal unit 146 for the system 10 shown and described in FIGS. 7 and 12. Once in its operational configuration with the upper chamber 306 and the middle chamber 304 extended, the lower chamber unit 302, the middle chamber unit, the upper chamber unit, and the seal unit 318 will define a water tight compartment. The container system 300 can then be filled and emptied through valves or ports 324 such as those shown in FIG. 22.

Figure 24:
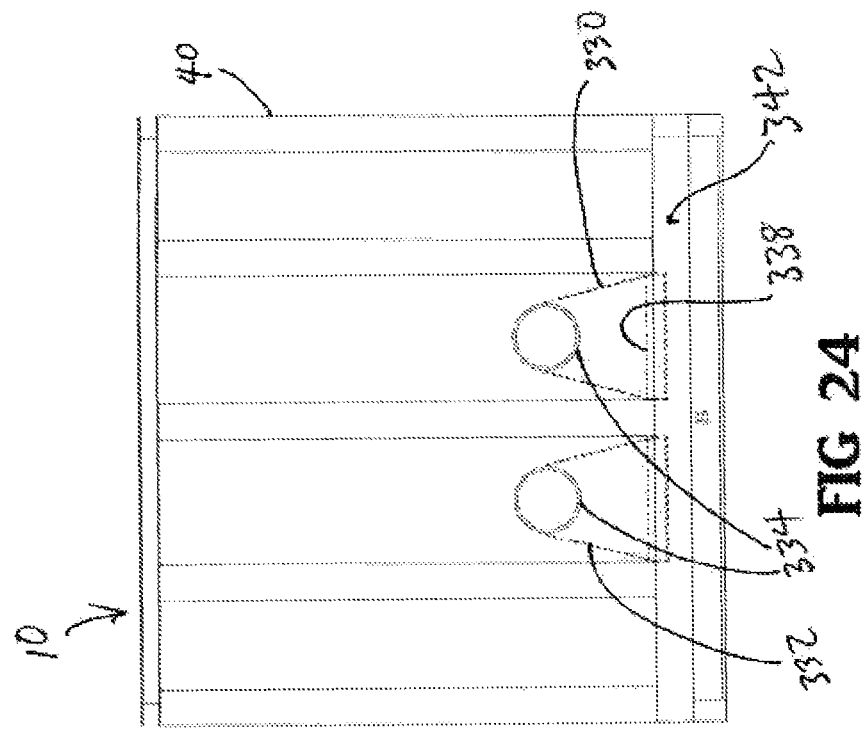
FIG. 24 is a plan view of the container system of FIG. 23 showing the weir box for use with the present invention.
Figure 23:
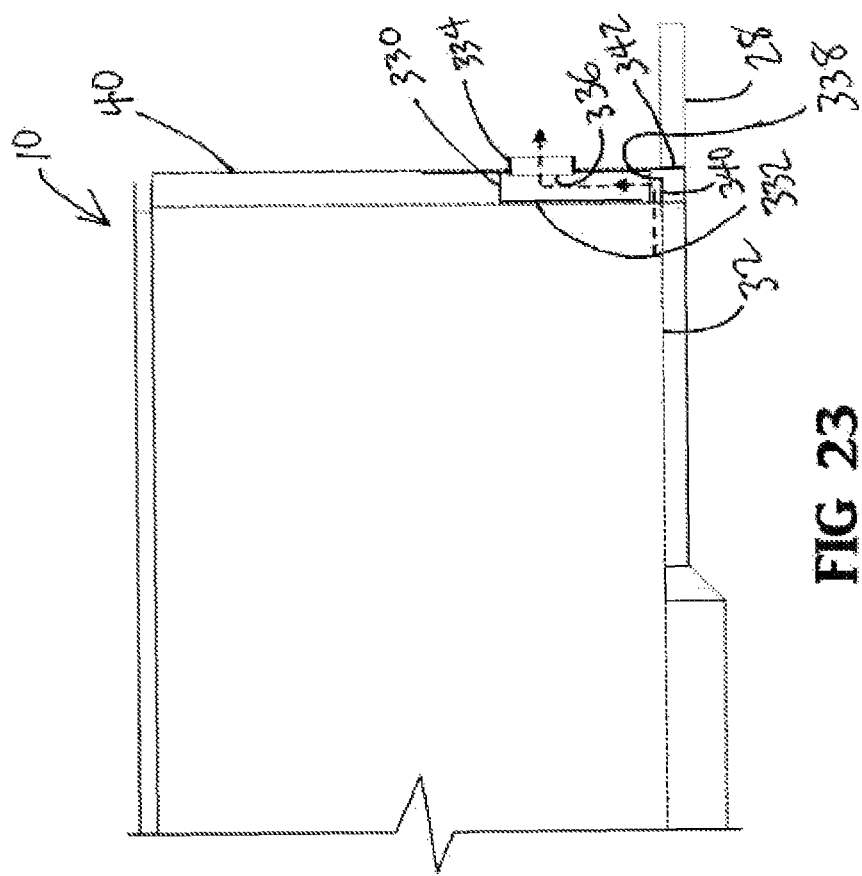
FIG. 23 is an end view of a container system built in accordance with the present invention showing a port for fluid access to the container system.

With reference now to FIGS. 23 and 24, a drain system 330 for use with the container system 10 (or 300) is shown. The drain system 330 may be used for removing fluid from the system 10. The preferred embodiment of the drain system 330 for use with the present invention comprises a weir box 332 operatively connected to a port 334 in the front wall 40 of the bottom chamber 12. The weir box 332 is preferably secured to an inner side 3-34 of the front wall 40 of the lower chamber 12. The weir box 332 comprises a first open circular end 336 secured to the port 334. The weir box 332 more preferably extends from the open circular end 336 to a second open chamber access end 338, located proximate the floor 32 of the lower chamber 12. Most preferably, the open chamber access end 338 would be positioned in a cutout 340 of a bottom beam 342 for the front wall 40. In the preferred embodiment for the container system 10, the bottom beam 342 comprises a 6×6 tubular beam. Use of the weir box 332 would allow fluids to be removed from the container system 10 with a conventional pump system (not shown) attached to the port 334, while also allowing the upper chamber 14 to move to the collapsed position without further modification. As an alternative to the weir box 332, the drain system may comprise a conventional fill tube (not shown) extending from the port 334 down to the floor 32 of the tank. Preferably, the fill tube would need to be inserted and connected to the port after the upper chamber 14 is moved to the extended position.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. A portable fluid storage container system comprising:
a lower chamber comprising a bottom and at least one side wall secured to the bottom and having a top edge, the top edge defining an open top of the lower chamber; and
the lower chamber further comprising at least one wall hook secured to the at least one side wall proximate the top edge;
an upper chamber comprising a top and at least one side wall secured to the top and having a bottom edge, the bottom edge defining an open bottom of the upper chamber; and
the upper chamber further comprising a retaining plate secured to the at least one side wall proximate the bottom edge;
wherein the upper chamber is movable between a first collapsed position in which the upper chamber is disposed within the lower chamber and a second extended position in which the upper chamber sits above the lower chamber;

a lift system operatively connected to the lower chamber and the upper chamber, the lift system operable to move the upper chamber between the collapsed position and the extended position;

a seal unit disposed to engage a perimeter of the lower chamber and a perimeter of the upper chamber when the upper chamber unit is in the extended position;

a trailer axle and wheels connected to the lower chamber, the wheels allowing for rolling support of the lower chamber; and a trailer tongue secured to the lower chamber, the tongue permitting the lower chamber to be towed on the wheels;

wherein when the upper chamber is in the extended position the wall hook of the lower chamber engages the retaining plate of the upper chamber;

wherein when the upper chamber is in the extended position the lower chamber, the seal unit, and the upper chamber define a water tight compartment.

2. The system of claim 1 wherein the at least one side wall of the upper chamber comprises a front wall, a back wall, and a pair of opposing longitudinal walls; and wherein the at least one side wall of the lower chamber comprises a front wall, a back wall, and a pair of opposing longitudinal walls.

3. The system of claim 2 wherein the lift system comprises:
a first motor secured to the front wall of the lower chamber;
a first rack and pinion system operatively connected to the first motor, the rack and pinion system comprising:
  a toothed rack secured to the front wall of the upper chamber; and
  a spur gear connected to the front wall of the lower chamber and disposed to engage the rack;
a second motor secured to the back wall of the lower chamber; and
a second rack and pinion system operatively connected to the second motor, the rack and pinion system comprising:
  a toothed rack secured to the back wall of the upper chamber; and
  a spur gear connected to the back wall of the lower chamber and disposed to engage the rack.

4. The system of claim 3 wherein the lift system further comprises a timing bar operatively connected to the first motor and the second motor.

5. The system of claim 2 wherein the seal unit comprises a rubber gasket.

6. The system of claim 5 wherein the seal unit further comprises:
an upper chamber flange connected to the bottom edge of the upper chamber; and
a lower chamber flange connected to the top edge of the lower chamber; and
wherein the rubber gasket is secured to the lower chamber flange.

7. The system of claim 6 wherein the upper chamber flange comprises a flange extension extending from the upper chamber into an annulus between the upper chamber and the lower chamber; and
wherein the lower chamber flange comprises a flange bracket extending from the lower chamber into the annulus.

8. The system of claim 7 wherein the rubber gasket is compressible, such that when the upper chamber unit is in the extended position the rubber gasket is compressed between the flange bracket and the flange extension.

9. The system of claim 2 wherein the lift system comprises a plurality of screw jack arrangements, each arrangement comprising:
a screw jack;
a lift plate secured to the upper chamber; and
a lift post having a first end operatively connected to the screw jack and a second end secured to the lift plate.

10. The system of claim 9 wherein the screw jack comprises a base motor and a screw post; and
wherein the lift post comprises a traveling nut adapted to be screwed onto the screw post and a lift column secured at a first end to the traveling nut and at a second end to the lift plate.

11. The portable fluid storage container system of claim 1 wherein the at least one side wall of the upper chamber comprises a pair of opposing side walls; and
wherein the upper chamber further comprises at least one cross beam connected between the opposing side walls and across the open bottom of the upper chamber.

12. A portable fluid storage container system comprising:
a lower chamber comprising a bottom, a front wall, a back wall, and a pair of opposing longitudinal side walls, the walls secured to the bottom and having a top edge, the top edge defining an open top of the lower chamber;
an upper chamber comprising a top, a front wall, a back wall, and a pair of opposing longitudinal side walls, the walls secured to the top and having a bottom edge, the bottom edge defining an open bottom of the upper chamber; and
the upper chamber further comprising at least one cross beam connected between the opposing side walls and across the open bottom of the upper chamber;
wherein the upper chamber is movable between a first collapsed position in which the upper chamber is disposed within the lower chamber and a second extended position in which the upper chamber sits above the lower chamber;
a lift system operatively connected to the lower chamber and the upper chamber, the lift system operable to move the upper chamber between the collapsed position and the extended position;
a seal unit disposed to engage the lower chamber and the upper chamber when the upper chamber unit is in the extended position;
a bulge preventer adapted to connect the side walls of the lower chamber to the side walls of the upper chamber when the upper chamber is in the extended position, the bulge preventer comprising:
  a plurality of wall hooks secured to the opposing side walls of the lower chamber; and
  a plurality of retaining plates secured to the opposing side walls of the upper chamber; and
  wherein when the upper chamber is in the extended position the plurality of wall hooks of the lower chamber engage the plurality of retaining plates of the upper chamber;
a trailer axle and wheels connected to the lower chamber, the wheels allowing for rolling support of the lower chamber; and
a trailer tongue secured to the lower chamber, the tongue permitting the lower chamber to be towed on the wheels;
wherein when the upper chamber is in the extended position the lower chamber, the seal unit, and the upper chamber define a water tight compartment.

* * * * *